Aug. 4, 1936.     C. J. WHITELEY     2,049,579
FOOD GRINDER COVER
Filed Dec. 2, 1933
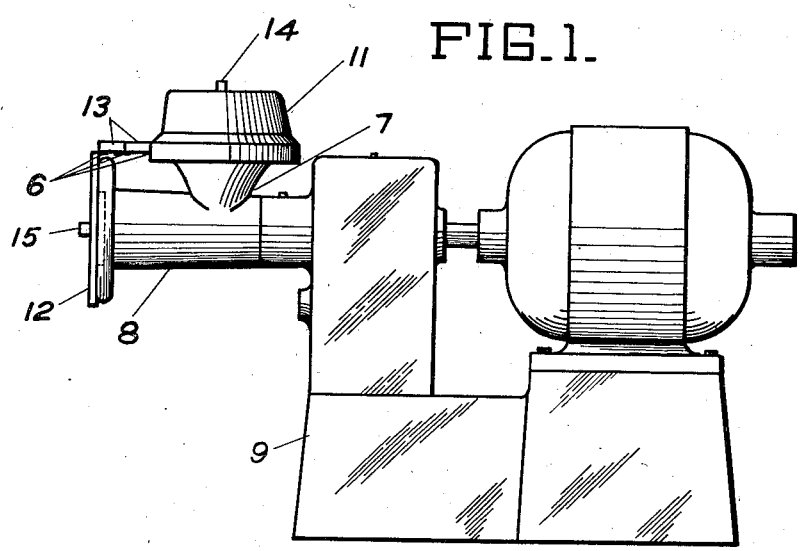
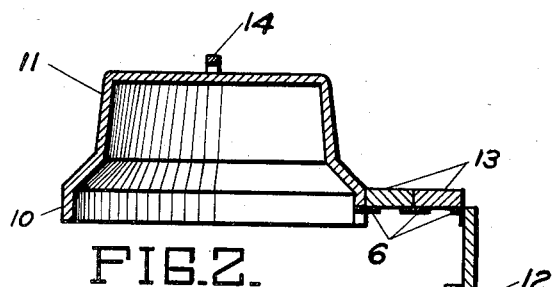
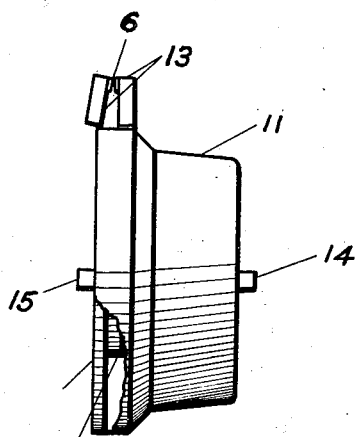
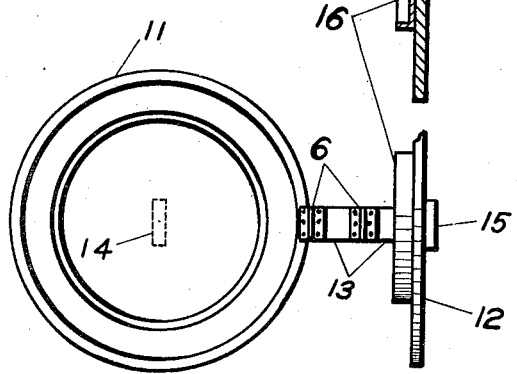
INVENTOR
CHARLES J. WHITELEY
BY Ernest L. Wallace
ATTORNEY Patented Aug. 4, 1936

2,049,579

UNITED STATES PATENT OFFICE 2,049,579

FOOD GRINDER COVER

Charles J. Whiteley, Alhambra, Calif.

Application December 2, 1933, Serial No. 700,686

3 Claims. (Cl. 146—182)

This invention relates to a device adaptable for use with cutters, grinders or comminutors of food materials which are subject to contamination by insects, dirt and other extraneous foreign materials which may come in contact therewith. The present invention is adapted to be employed with such devices wherein there is a feed hopper and a delivery mouth. As disclosed herein, it is shown applied to a meat or vegetable grinder of a type in common use. More particularly the invention appertains to a cover for shielding either or both the hopper and delivery mouths of such devices.

The objects of this invention are to provide a cover unit detached from the grinder or cutter and having any or all of the following features:— Feed hopper and delivery lids so connected as to adapt the unit for use on varieties of grinders without adjustment; feed hopper and delivery lids so arranged and connected that they may be closed on one another to coactively shield the parts which may come in contact with the food; and details of structure contributing to simplicity, economy of manufacture, ease of manipulation and accommodation to different grinders.

These objects are accomplished by means of the embodiment of my invention illustrated in the accompanying drawing, in which:—

Fig. 1 is a side elevational view of a standard type of grinder with my cover unit in position thereon; Fig. 2 is a transverse sectional view of the unit on an enlarged scale; Fig. 3 is a view looking from below upon the structure shown in Fig. 2; and Fig. 4 is a side elevation of the unit with lids closed on one another and parts broken away to better show the relation of lids.

Referring with more particularity to the drawing, and especially to Fig. 1, a conventional type of motor operated grinder such as is used in butcher shops is shown. The grinder comprises a hopper 7 into which the meat or food material is fed. The material is carried along through the barrel 8 and passes out through the delivery mouth of the barrel in ground condition. The motor unit 9 serves as a support for the grinder. Such grinders without some means to cover the mouths, permit flies and insects to gather on the food exposed, and may if they enter the hopper mouth be carried along and ground up with the food. Dust and foreign matter may settle on the exposed meat. In an attempt to shield the normally exposed food it has been common practice to place a cloth over the grinder. However, this cloth becomes dirty from handling and wet with the food juices, thereby forming an attraction for flies and insects.

The cover shown herein consists of a dome like lid 11 for the hopper with a bell shaped mouth 10 adapted to slip over the hopper mouth. A lid 12 preferably flat is connected to lid 11 by a multiple leaf hinge 13. For convenience in handling, the lid 11 is provided with a handle 14 and the lid 12 with a handle 15. The lid 12 is preferably of disk form and of an extent equal to or greater than the opening or mouth 10. Lid 12 has an annular flanged member 16 which is adapted to be nested in the delivery mouth of the grinder.

It will be noted that the dome like lid 11 when placed over the hopper mouth will permit the usual wooden plunger for pressing down food to be housed therein. The lid 12 overhangs the delivery end of the barrel and leaf hinge 13 accommodates the positions of the lids to the space between hopper and delivery. A shorter space than that shown in the drawing would result in the hinge leaves buckling. The hinge in this respect forms a flexible coupling.

When the cover is removed from the grinder, it will have adhering thereto some of the food or juices which would attract insects. Furthermore, the faces of the cover which had been in contact with the food would, if left exposed, collect flies and dust. The present construction enables the lid 12 to be folded against lid 11 as shown in Fig. 4 to fully protect the faces. It also provides a compact aggroupment of the lids.

Obviously, the placement and removal of the cover is easily accomplished and the cover may be used for more than one grinder as it is not attached. The normally exposed parts of the grinder are kept sanitary when my cover is placed thereon, and the cover itself may be arranged so as to be sanitary and closed against entrance of objectionable matter when removed from the grinder.

What I claim is:—

1. A cover for a device of the character described comprising a dome like hopper lid, a delivery mouth lid of peripherial extent not less than that of the mouth of said hopper lid, an annular lip on the inner face of said delivery mouth lid for nesting in the delivery mouth of said device, and a flexible hinge coupling permanently connecting said lids at their peripheries.

2. A cover for a device of the character described comprising a dome like hopper lid, a delivery mouth lid, an annular lip on the inner face of said delivery mouth lid for nesting in the delivery mouth of said device, and a multiple leaf hinge connecting said lids at their peripheries.

3. A cover for a device of the character described comprising a dome like hopper lid, a delivery mouth lid of peripherial extent not less than that of the mouth of said hopper lid, an annular lip on the inner face of said delivery mouth lid for nesting in the delivery mouth of said device, and a multiple leaf hinge connecting said lids at their peripheries.

CHARLES J. WHITELEY.